US006611200B2

(12) United States Patent
Pressnall et al.

(10) Patent No.: US 6,611,200 B2
(45) Date of Patent: Aug. 26, 2003

(54) METHOD FOR VIEWING THROUGH TINTED WINDOWS

(75) Inventors: Timothy A. Pressnall, Albuquerque, NM (US); Patrick R. Dodd, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/682,661

(22) Filed: Oct. 3, 2001

(65) Prior Publication Data

US 2003/0063192 A1 Apr. 3, 2003

(51) Int. Cl.[7] .................................................. B60Q 1/00

(52) U.S. Cl. ................................ 340/425.5; 340/426.6; 340/426.1; 348/61; 348/73; 348/82; 348/158

(58) Field of Search ........................... 340/425.5, 426.1, 340/426.24, 426.26; 348/61, 73, 82, 158; 600/109, 112

(56) References Cited

U.S. PATENT DOCUMENTS

| | | | | | |
|---|---|---|---|---|---|
| 4,949,186 | A | * | 8/1990 | Peterson | 386/107 |
| 5,012,335 | A | * | 4/1991 | Cohodar | 348/158 |
| 5,056,097 | A | * | 10/1991 | Meyers | 372/29.014 |
| 5,079,629 | A | * | 1/1992 | Oz | 348/77 |
| 5,373,320 | A | * | 12/1994 | Johnson et al. | 348/217.1 |
| 5,662,586 | A | * | 9/1997 | Monroe et al. | 600/110 |
| 6,236,737 | B1 | * | 5/2001 | Gregson et al. | 382/103 |
| 6,369,849 | B1 | * | 4/2002 | Rzyski | 348/61 |
| 6,420,704 | B1 | * | 7/2002 | Berenty et al. | 250/330 |

* cited by examiner

*Primary Examiner*—Daryl Pope
(74) *Attorney, Agent, or Firm*—James M. Skorich; Kenneth E. Callahan

(57) ABSTRACT

A method for the undetected surveillance of structures or vehicles in low light or night time conditions by illuminating the interior with a near infrared light source and viewing the illuminated scene with a standard video camera/monitor.

10 Claims, 2 Drawing Sheets

METHOD FOR VIEWING THROUGH TINTED WINDOWS

FEDERAL RESEARCH STATEMENT

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF INVENTION

The present invention is in the field of surveillance, and in particular relates to an undetected method viewing through tinted windows.

U.S. Pat. No. 6,150,930 discloses a video system mounted on the front of an automobile to improve visibility at night or in low visibility conditions, e.g., fog, smoke or snow. An illuminator fixedly mounted on the front of the automobile lights up the road ahead. A video camera and video system combines the visible and near infrared reflections onto a video monitor to improve visibility. A similar but operator controlled and portable system is used in the present invention to provide a method of covertly inspecting the interior of structures or vehicles having tinted windows.

Tinted windows are commonly used on automobiles and in buildings to reduce the sun's glare. They do not significantly reducing the visibility of a person looking out, particularly during daylight conditions. In low light or nighttime conditions, however, tinted windows prevent a person on the outside from seeing into an automobile or building when the interior is unlit. This can present a serious problem for law enforcement personnel, who for example, stop an automobile in the course of their duties. The tinted windows obscure the activities of the car's occupants leaving the officer in a potentially vulnerable situation.

Consequently, there is a law enforcement need for an undetectable method of viewing the interior of an automobile or building with tinted windows in low light conditions.

SUMMARY OF INVENTION

In a preferred embodiment, the interior of structures having tinted windows is illuminated by a broadband near infrared (NIR) light source and the illuminated scene is viewed using a standard video camera and monitor.

Other aspects and advantages of the present invention will become apparent from the following detailed description, taken in conjunction with the accompanying drawing, illustrating by way of example the principles of the invention.

DETAILED DESCRIPTION

Figure 1:
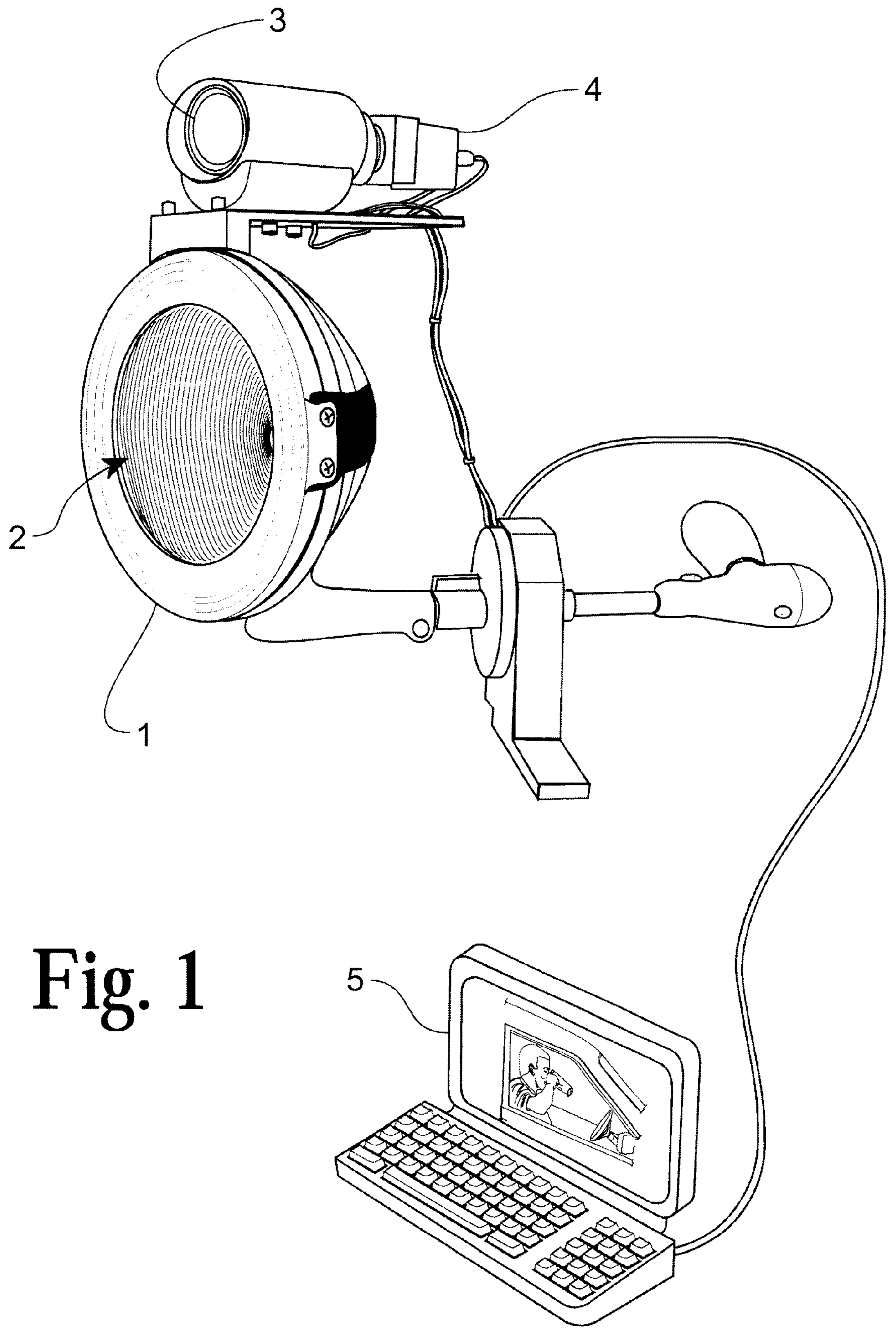
FIG. 1 illustrates a spotlight with a broadband near infrared filter and an attached video camera and monitor that can be used to see through tinted windows.

The method of the present invention, nicknamed the "Tint Buster," in one embodiment uses a broadband near infrared (NIR) filter over an ordinary spotlight to illuminate the inside of automobiles or other structures with tinted windows. It can be mounted on the outside of an automobile. Police vehicles commonly have this type of spotlight mounted on their vehicles. Standard window tints are not opaque in the NIR frequencies and are in fact more transparent in the NIR than in the visible spectrum. A standard video camera is used in conjunction with the NIR light to view the scene, converting the NIR light to a black and white visible image on a standard CRT or flat screen video monitor. FIG. 1 illustrates this embodiment. A spotlight 1 with a NIR filter 2 has a video camera 4 mounted above it. The camera may have a zoom lens 3 controlled by a small control panel with the camera monitor built into it 5. The control panel and monitor can be located within the automobile.

Figure 2A:
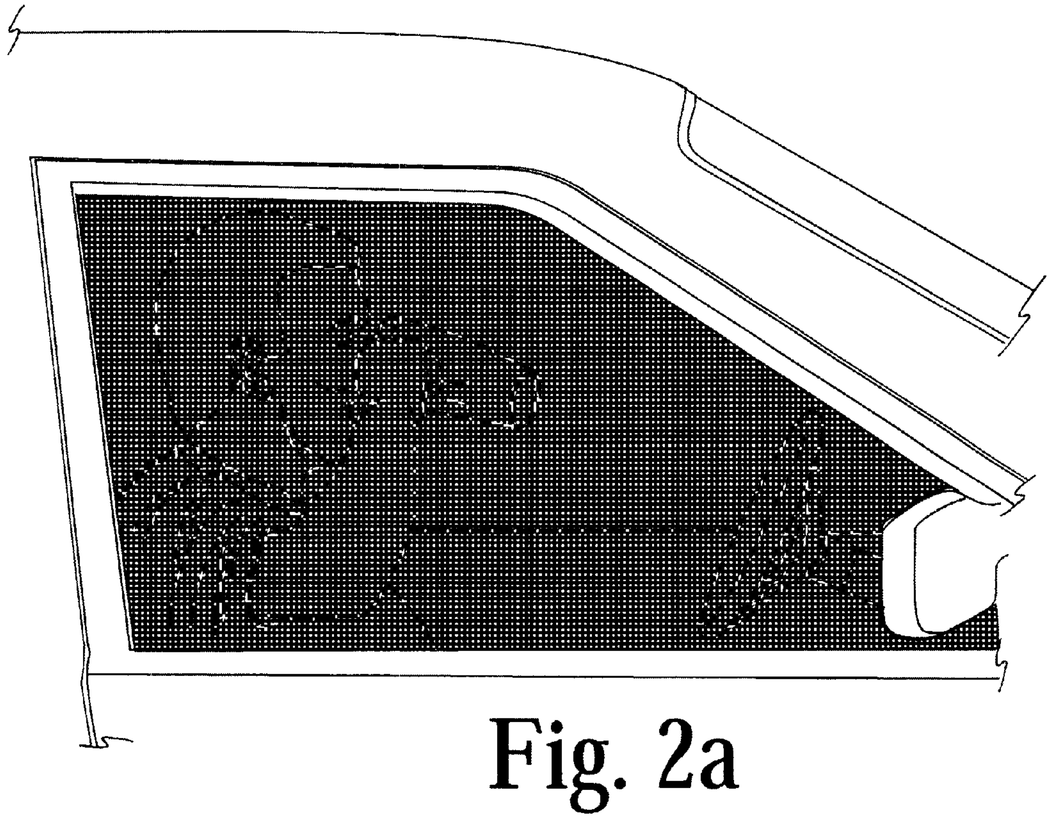
FIG. 2*a* shows the obscuring effect of a tinted automobile window illuminated with a 5 million-candle power Maxa Beam™ spotlight in typical low light conditions.
Figure 2B:
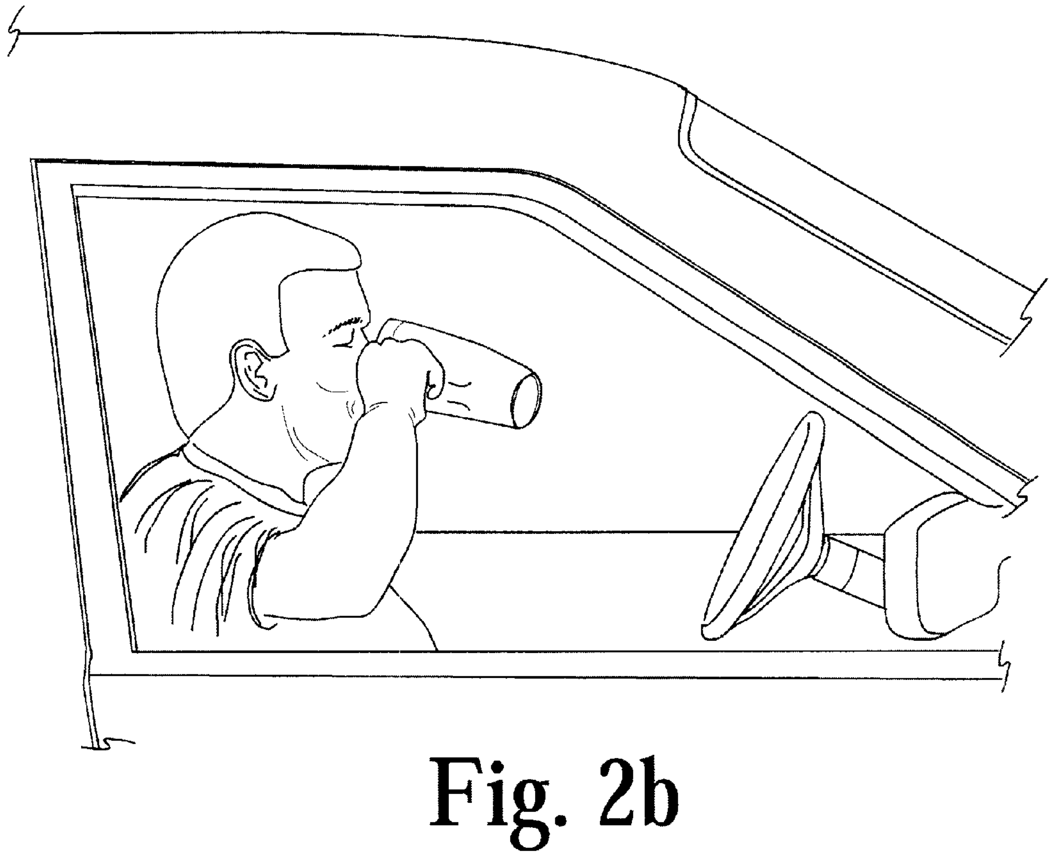
FIG. 2*b* shows the same scene as FIG. 2*a* illuminated by a NIR source as viewed on a video monitor.

FIG. 2*a* shows a typical medium tinted car window under low light conditions. The interior is totally obscured when view in visible light. FIG. 2*b* shows the same window illuminated with a spotlight using a NIR filter. The filter transmits light in the 800 to 900 nanometer wavelength range. The occupant is clearly visible and is unaware he is being observed. The spectrum emitted by the spotlight extends into the NIR and the sensitivity of standard video cameras encompasses the NIR.

A particular advantage of this wavelength band for law enforcement personnel is the covert nature of the illumination, being outside the visible wavelength range of the human eye. In addition all the components of the FIG. 1 system are standard off the shelf items. As an alternative, a NIR laser could be used as the illuminating source. It is also possible to place the NIR Filter onto the camera and use white light to achieve similar results, but the covert aspect would be lost.

What is claimed is:

1. A method for the undetected surveillance of the interior of structures or vehicles with tinted windows, the method comprising:

illuminating the interior of said structures or vehicles through their tinted windows using a standard spotlight covered by a near infrared light filter;

viewing the near infrared illuminated interior of said structures or vehicles using a standard video camera transmitting directly to a standard video monitor; and varying the view of said video camera by manually adjusting a zoom lens mounted on said video camera; wherein changing the light filter dependent on the range of infrared frequencies filters out by the tinted windows, whereby near infrared light emitted by the spotlight and the light filter would pass through the tinted windows.

2. A method for the undetected surveillance of the interior of a motor vehicle with tinted windows, the method comprising:

illuminating the interior of said motor vehicle through its tinted windows using a standard spotlight covered by a near infrared light filter;

viewing the near infrared illuminated interior of said motor vehicle using a standard video camera transmitting directly to a standard video monitor; and changing the light filter dependent on the range of infrared frequencies filtered out by the tintied windows, whereby near infrared light emitted by the spotlight and the light filter passes through the tinted windows.

3. An assembly adaptable for mounting on a vehicle for viewing an object located behind a tinted window, comprising:

a light source for emitting near infrared light, with the light source being adapted for mounting on a vehicle;

a video camera for receiving the near infrared light reflected from an object;

the light source being separate from the video camera; and a video monitor for receiving a signal stream transmitted by the video camera, and for displaying an image of the object derivable from the signal stream; wherein the light source is comprised of a source of full-spectrum light in combination with a filter for passing only the near infrared light.

4. A viewing assembly as defined in claim 3, wherein the light source includes a zoom lens mounted thereon.

5. A viewing assembly as defined in claim 4 wherein the light source has claim a frequency range of 800 to 900 nanometers.

6. A viewing assembly as defined in claim 3 wherein the light source is a laser.

7. An assembly adaptable for mounting on a vehicle for viewing an object located behind a tinted window, comprising:

a light source for emitting full-spectrum light, with the light source being adapted for mounting on a vehicle;

a video camera including a filter for passing only the near infrared light, for receiving near infrared light reflected from an object;

the light source being separate from the video camera; and a video monitor for receiving a signal stream transmitted by the video camera, and for displaying an image of the object derivable from the signal stream.

8. A viewing assembly as defined in claim 7, wherein the light source includes a zoom lens mounted thereon.

9. A viewing assembly as defined in claim 8 wherein the near infrared light has a frequency range of 800 to 900 nanometers.

10. A viewing assembly as defined in claim 7 wherein the light source is a laser.

* * * * *